United States Patent
Hunt et al.

(10) Patent No.: US 9,036,817 B1
(45) Date of Patent: May 19, 2015

(54) NETWORK COMMUNICATIONS USING QUANTUM KEY DISTRIBUTION

(71) Applicant: The Boeing Company, Chicago, IL (US)

(72) Inventors: Jeffrey H. Hunt, Thousand Oaks, CA (US); Wayne R. Howe, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 181 days.

(21) Appl. No.: 13/848,872

(22) Filed: Mar. 22, 2013

(51) Int. Cl.
  *H04L 9/00* (2006.01)
  *H04L 9/08* (2006.01)

(52) U.S. Cl.
  CPC .................................. *H04L 9/0852* (2013.01)

(58) Field of Classification Search
  CPC .. G06N 99/002; H04L 9/0858; H04L 9/0852; H04L 9/0855; H04L 9/0883; G02F 1/39; H01L 2924/0002
  USPC .......................................................... 380/44
  See application file for complete search history.

(56) References Cited

U.S. PATENT DOCUMENTS

| | | | |
|---|---|---|---|
| 6,535,324 B1 * | 3/2003 | Hwang et al. ................. | 359/283 |
| 7,881,473 B2 | 2/2011 | Wang et al. | |
| 2001/0055389 A1 * | 12/2001 | Hughes et al. ................. | 380/44 |
| 2006/0153573 A1 * | 7/2006 | Tomaru ......................... | 398/152 |
| 2010/0208893 A1 * | 8/2010 | Toyoshima et al. ........... | 380/256 |
| 2012/0230493 A1 * | 9/2012 | Bowes .......................... | 380/278 |

OTHER PUBLICATIONS

Stipcevic et al., "Quantum random number generators and their use in cryptography," MIPRO 2011 Proceedings of the 34th International Convention, May 2011, pp. 1474-1479.
Hughes et al., "Practical Free-Space Quantum Key Distribution Over 10 Km in Daylight and at Night," New Journal of Physics 4, Jul. 2002, pp. 43.1-43.14.
Buttler et al., "Daylight Quantum Key Distribution Over 1.6 Km," Feb. 1, 2008, 4 pages, accessed Feb. 1, 2013. http://arxiv.org/abs/quant-ph/0001088.

\* cited by examiner

*Primary Examiner* — Ali Abyaneh
*Assistant Examiner* — David Massie
(74) *Attorney, Agent, or Firm* — Yee & Associates, P.C.

(57) ABSTRACT

A method and apparatus for forming and distributing quantum encryption keys. A first quantum signal generated by a number generator in a communicator is transmitted through an aperture in the communicator to a receiving communicator. A second quantum signal is received through the aperture at the communicator from a transmitting communicator. The first quantum signal is isolated from the second quantum signal such that the first quantum signal is transmitted from the communicator in response to the first quantum signal passing through the aperture and such that the second quantum signal is received at a number detector in the communicator in response to the second quantum signal passing through the aperture.

16 Claims, 6 Drawing Sheets

NETWORK COMMUNICATIONS USING QUANTUM KEY DISTRIBUTION

BACKGROUND INFORMATION

1. Field

The present disclosure relates generally to quantum communication and, in particular, to quantum communication within a communications network. Still more particularly, the present disclosure relates to an apparatus and method for allowing one communicator to establish multiple quantum encryption keys with different communicators in a communications network.

2. Background

Quantum communication involves encoding information in quantum bits. As used herein, a "quantum bit," which may be also referred to a qubit, is a two-state quantum mechanical system. The quantum mechanical system may be realized using, for example, without limitation, the polarization of a single photon. The qubit may have two polarization states, vertical polarization and horizontal polarization. Quantum mechanics allows a qubit to be in one state, the other state, or a superposition of both states at any given point in time.

Quantum cryptography is the use of quantum mechanical effects to perform cryptographic tasks, such as, for example, encrypting and decrypting data. Quantum key distribution is a widely used quantum cryptographic technique that allows secure point-to-point communication. Point-to-point communication may be communication between a sender and a receiver over a communications channel between the sender and the receiver.

With quantum key distribution, the sender and the receiver may produce a shared random encryption key that is known only to them. The random encryption key may be a set of data bits that have been encoded using qubits. The sender encrypts the data using the random encryption key and sends this quantum encrypted data to the receiver. The receiver decrypts the quantum encrypted data using the random encryption key. This type of quantum encryption may ensure secure communications over standard communications channels, such as, for example, unsecure public communications channels.

However, with some currently available methods for communicating using quantum key distribution, network communications may be difficult. For example, in some cases, a communicator may be set up to send encrypted data or receive encrypted data, but not both. In other cases, a receiving communicator may only be configured for communications with a transmitting communicator and may be unable to communicate with a third communicator in the same communications network. Consequently, using quantum key distribution to exchange encrypted data over a large communications network may be more difficult than desired and, in some cases, may not be feasible. Therefore, it would be desirable to have a method and apparatus that address at least some of the issues discussed above, as well as other possible issues.

SUMMARY

In one illustrative embodiment, a communicator comprises a number generator, a number detector, and a signal isolator. The number generator is configured to transmit a first quantum signal through an aperture. The first quantum signal is configured for use in forming a first encryption key. The number detector is configured to detect a second quantum signal received through the aperture. The second quantum signal is configured for use in forming a second encryption key. The signal isolator is configured to isolate the first quantum signal from the second quantum signal such that the first quantum signal is transmitted from the communicator in response to the first quantum signal passing through the aperture and such that the second quantum signal is received at the number detector in response to the second quantum signal passing through the aperture.

In another illustrative embodiment, a communications network comprises a plurality of communicators. A communicator in the plurality of communicators comprises a number generator, a number detector, and a signal isolator. The number generator is configured to transmit a first quantum signal through an aperture. The first quantum signal is configured for use in forming a first encryption key. The number detector is configured to detect a second quantum signal received through the aperture. The second quantum signal is configured for use in forming a second encryption key. The signal isolator is configured to isolate the first quantum signal from the second quantum signal such that the first quantum signal is transmitted from the communicator in response to the first quantum signal passing through the aperture and such that the second quantum signal is received at the number detector in response to the second quantum signal passing through the aperture.

In yet another illustrative embodiment, a method for forming encryption keys is provided. A first quantum signal generated by a number generator in a communicator is transmitted through an aperture in the communicator to a receiving communicator. A second quantum signal is received through the aperture at the communicator from a transmitting communicator. The first quantum signal is isolated from the second quantum signal such that the first quantum signal is transmitted from the communicator in response to the first quantum signal passing through the aperture and such that the second quantum signal is received at a number detector in the communicator in response to the second quantum signal passing through the aperture.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method for allowing a single communicator to communicate with more than one other communicator in a communications network. Further, the illustrative embodiments recognize and take into account that it may be desirable to have a system that allows a communicator to establish one quantum encryption key for sending encrypted data to one communicator and another quantum encryption key for receiving encrypted data from another communicator.

Thus, the illustrative embodiments provide an apparatus and method for establishing and distributing multiple quantum encryption keys at a communicator. In particular, the illustrative embodiments provide a quantum cryptography system by which a single communicator may be set up for establishing different quantum encryption keys with different communicators in a communications network.

Figure 1:
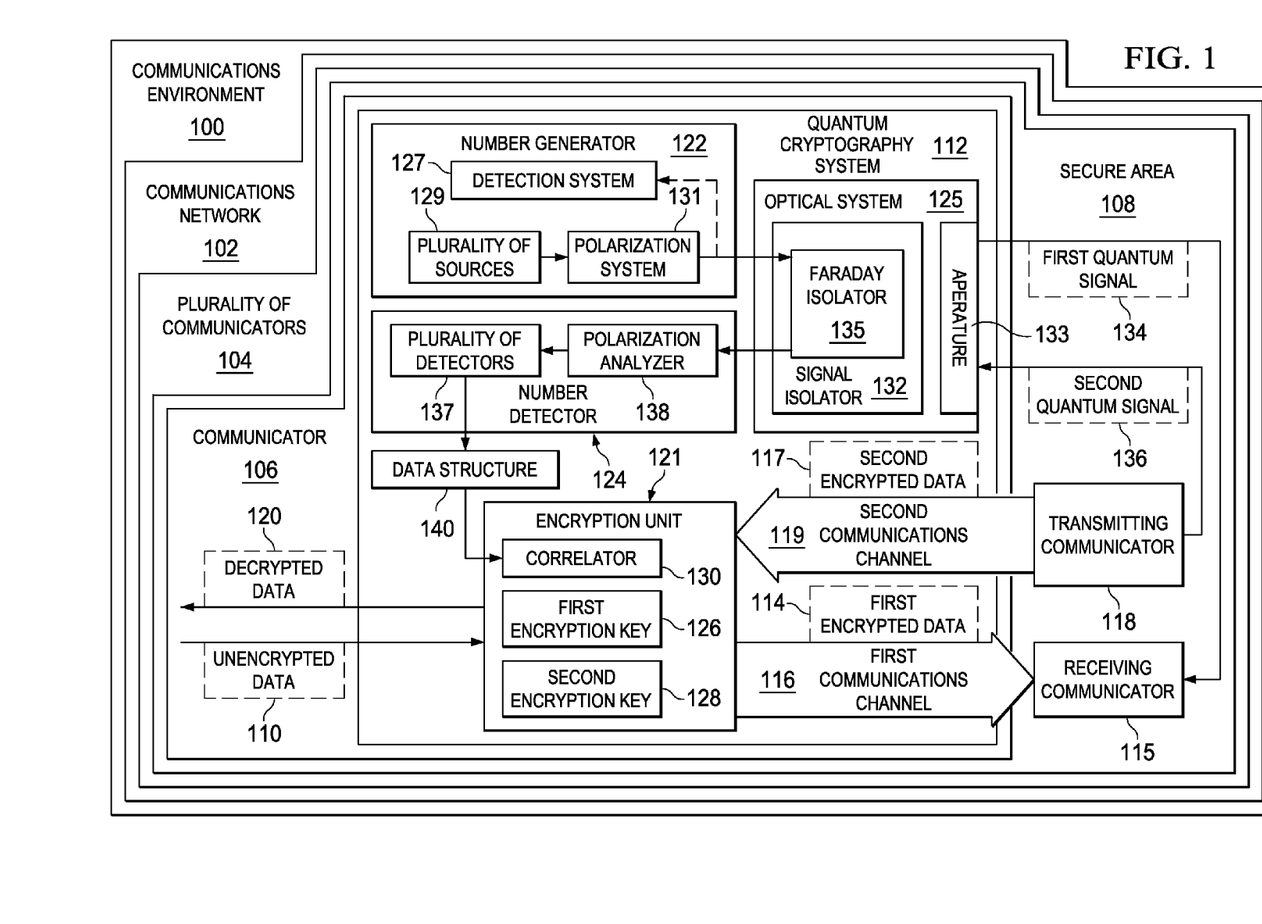
FIG. 1 is an illustration of a communications environment in the form of a block diagram in accordance with an illustrative embodiment.

Referring now to the figures and, in particular, with reference to FIG. 1, an illustration of a communications environment is depicted in the form of a block diagram in accordance with an illustrative embodiment. Communications environment 100 includes communications network 102. Communications network 102 may be comprised of plurality of communicators 104 configured to communicate with each other.

As used herein, a "communicator" in plurality of communicators 104 may be implemented in a number of different ways. For example, without limitation, a communicator may comprise at least one of a communications device, a switching device, a network switch, a router, a processor unit, a computer, an integrated circuit, a modem, a hub, a server, a workstation, a digital handset, or some other type of communications device.

As used herein, the phrase "at least one of," when used with a list of items, means different combinations of one or more of the listed items may be used, and only one of the items in the list may be needed. For example, "at least one of item A, item B, and item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination. The item may be a particular object, thing, or a category. In other words, "at least one of" means any number of and any combination of items may be used from the list, but not all of the items in the list may be required.

Communicator 106 is an example of one of plurality of communicators 104. As depicted, communicator 106 may be located within secure area 108. In one illustrative example, secure area 108 is a physically secure area in which all data transmissions into and out of secure area 108 may be performed using communicator 106. All data sent from and received at communicator 106 may be encrypted such that the data handled and processed by other devices within secure area 108 may remain secure.

For example, communicator 106 may need to send data to receiving communicator 115 over first communications channel 116 and receive data from transmitting communicator 118 over second communications channel 119. Both receiving communicator 115 and transmitting communicator 118 may be located outside of secure area 108.

As used herein, a "communications channel," such as first communications channel 116 and second communications channel 119, may be selected from a group that includes a wired communications channel, a wireless communications channel, an optical communications channel, a fiberoptic channel, a waveguide, or some other type of communications channel or link.

In one illustrative example, first communications channel 116 and second communications channel 119 may be public communication channels that are not considered secure. Consequently, data may need to be encrypted prior to being sent over first communications channel 116 and second communications channel 119.

For example, communicator 106 may use quantum cryptography system 112 to encrypt unencrypted data 110 and form first encrypted data 114. First encrypted data 114 may then be sent to receiving communicator 115 over first communications channel 116. Further, communicator 106 may receive second encrypted data 117 from transmitting communicator 118 over second communications channel 119. Communicator 106 may use quantum cryptography system 112 to decrypt second encrypted data 117 and form decrypted data 120.

As depicted, quantum cryptography system 112 includes encryption unit 121, number generator 122, number detector 124, and optical system 125. Encryption unit 121 is configured to encrypt unencrypted data 110 using first encryption key 126. Further, encryption unit 121 is configured to decrypt second encrypted data 117 using second encryption key 128.

First encryption key 126 and second encryption key 128 may each be a set of data bits that have been encoded using qubits. As used herein, a "set of" items may be one or more items. In this manner, a set of data bits may be one or more data bits. First encryption key 126 and second encryption key 128 may also be referred to as quantum encryption keys.

Number generator 122 may be used to generate numbers for use in establishing an encryption key when encrypted data is to be sent from communicator 106. Number generator 122 includes plurality of sources 129, polarization system 131, and detection system 127. In this illustrative example, each of plurality of sources 129 may take the form of a photon source. The photon source may be, for example, a laser device.

To establish first encryption key 126 with receiving communicator 115, each of plurality of sources 129 emits a source photon that is received by polarization system 131. Polarization system 131 polarizes these source photons to form polarized photons. The polarization states of these source photons are combined, or more specifically, superposed, to form an outgoing photon that is directed towards optical system 125. In other words, the outgoing photon may be in a state that is a superposition of the two polarization states of the two source photons. This outgoing photon represents a qubit that is to be transmitted to receiving communicator 115 for use in establishing first encryption key 126.

Detection system 127 may be used to detect the polarization of the outgoing photon and convert the light energy in the outgoing photon into an electrical signal that may be read and stored by quantum cryptography system 112. Each sample of the electrical signal read may represent a bit value. In other words, each outgoing photon may be detected and recognized as having a bit value of either a "1" or a "0."

The process described above may be repeated for each qubit needed to form first encryption key 126. The one or more outgoing photons formed in this manner are transmitted from communicator 106 through optical system 125 in the form of first quantum signal 134. First quantum signal 134 is a quantum encrypted signal in this illustrative example. The bit values detected by detection system 127 for the outgoing photons used to form first quantum signal 134 may be used by quantum cryptography system 112 to establish first encryption key 126 with receiving communicator 115.

In one illustrative example, first quantum signal 134 may be propagated through a first quantum channel by optical system 125. As used herein, a "quantum channel" may refer to an abstract path of communications. These communications may be implemented within free-space, within a fiberoptic network, or using some other type of quantum channel or quantum system. Optical system 125 may include any number of beam expanders, telescopes, mirrors, and/or other types of optical elements needed to focus the outgoing photons such that the outgoing photons pass through aperture 133 of optical system 125.

First quantum signal 134 may be received and processed by receiving communicator 115 in a manner similar to the process by which communicator 106 may receive and handle a quantum signal. This process is described below. For example, communicator 106 may receive second quantum signal 136 from transmitting communicator 118 over a second quantum channel. Second quantum signal 136 is a quantum encrypted signal in this illustrative example.

Second quantum signal 136 may be generated and transmitted by transmitting communicator 118 in a manner similar to the manner in which first quantum signal 134 is generated and transmitted by communicator 106. In particular, second quantum signal 136 may comprise one or more incoming photons. These incoming photons represent qubits that may be used to establish second encryption key 128 with transmitting communicator 118.

Second quantum signal 136 may be received through aperture 133 of optical system 125. Optical system 125 may direct the one or more incoming photons in second quantum signal 136 to number detector 124. Number detector 124 detects the numbers encoded in the incoming photons by transmitting communicator 118 for use in establishing second encryption key 128.

As depicted, number detector 124 includes plurality of detectors 137 and polarization analyzer 138. Polarization analyzer 138 determines to which detector in plurality of detectors 137 each incoming photon is sent. Polarization analyzer 138 may randomly send photons in one type of polarization state to one of plurality of detectors 137 and photons in a different polarization state to another one of plurality of detectors 137. Each of plurality of detectors 137 converts light energy received at the detector into an electrical signal that may be read.

When one of plurality of detectors 137 detects an incoming photon, the electrical signal produced by the detector identifies a bit value of either "0" or "1" for the data bit that was encoded by the incoming photon. The bit values identified for all of the incoming photons in second quantum signal 136 may be stored in data structure 140.

Encryption unit 121 may access these values stored in data structure 140 for use in establishing second encryption key 128 with transmitting communicator 118. However, in some cases, quantum cryptography system 112 may be receiving multiple quantum signals from multiple communicators in plurality of communicators 104 at the same time. Consequently, encryption unit 121 may need a way in which to determine which bit values in data structure 140 correspond to the incoming photons received from transmitting communicator 118.

In one illustrative example, encryption unit 121 may communicate with a corresponding encryption unit in transmitting communicator 118 to correlate the bit values stored in data structure 140 with the bit values generated for the incoming photons of second quantum signal 136 by transmitting communicator 118. This correlation may be performed using correlator 130 within encryption unit 121.

Correlator 130 may receive the bit values generated by transmitting communicator 118 for the incoming photons, prior to the incoming photons being sent, from transmitting communicator 118. Correlator 130 may be used as a temporal filter to temporally correlate the bit values stored in data structure 140 with the bit values generated by transmitting communicator 118 for the incoming photons.

In some cases, a rastering technique may be used to perform this correlation. The rastering technique may be used to find the alignment between the bit values stored in data structure 140 and the bit values received from transmitting communicator 118 that results in a correlation error below a selected threshold. When the correct alignment of values and times has been achieved and the correct values in data structure 140 selected, the correlation error may be reduced to substantially zero or near zero within selected tolerances. Once the correct alignment has been achieved, the correct bit values may be selected for use in forming second encryption key 128.

In this illustrative example, optical system 125 includes signal isolator 132. Signal isolator 132 may be configured to isolate incoming photons from outgoing photons that pass through aperture 133. Signal isolator 132 may function as a physical filter for incoming photons and outgoing photons. For example, signal isolator 132 may ensure that only outgoing photons, such as those formed by polarization system 131 in number generator 122, are transmitted through aperture 133 to receiving communicator 115 and that only incoming photons, such as those received in second quantum signal 136, are received at number detector 124.

In one illustrative example, signal isolator 132 takes the form of Faraday isolator 135. Faraday isolator 135 may comprise, for example, without limitation, two crossed polarizers and a Faraday rotator positioned between these crossed polarizers.

In this manner, quantum cryptography system 112 may be used to allow quantum communications between communicator 106 and any number of different communicators in communications network 102. Multiple quantum signals may be transmitted from communicator 106 and multiple quantum signals may be received at communicator 106.

The illustration of communications environment 100 and quantum cryptography system 112 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Further, although the illustrative embodiments have been described using photons, some other type of quantum mechanical system may be used. For example, without limitation, first quantum signal 134 may be comprised of a plurality of outgoing electrons and second quantum signal 136 may be comprised of a plurality of incoming electrons. In other words, quantum communications and quantum cryptography between plurality of communicators 104 may be implemented using electrons instead of photons, or some other type of quantum mechanical system that may be used to form qubits.

Additionally, in other illustrative examples, more than one aperture may be present within optical system 125. For example, first quantum signal 134 may be transmitted through aperture 133, while second quantum signal 136 may be received through a second aperture within optical system 125.

Figure 2:
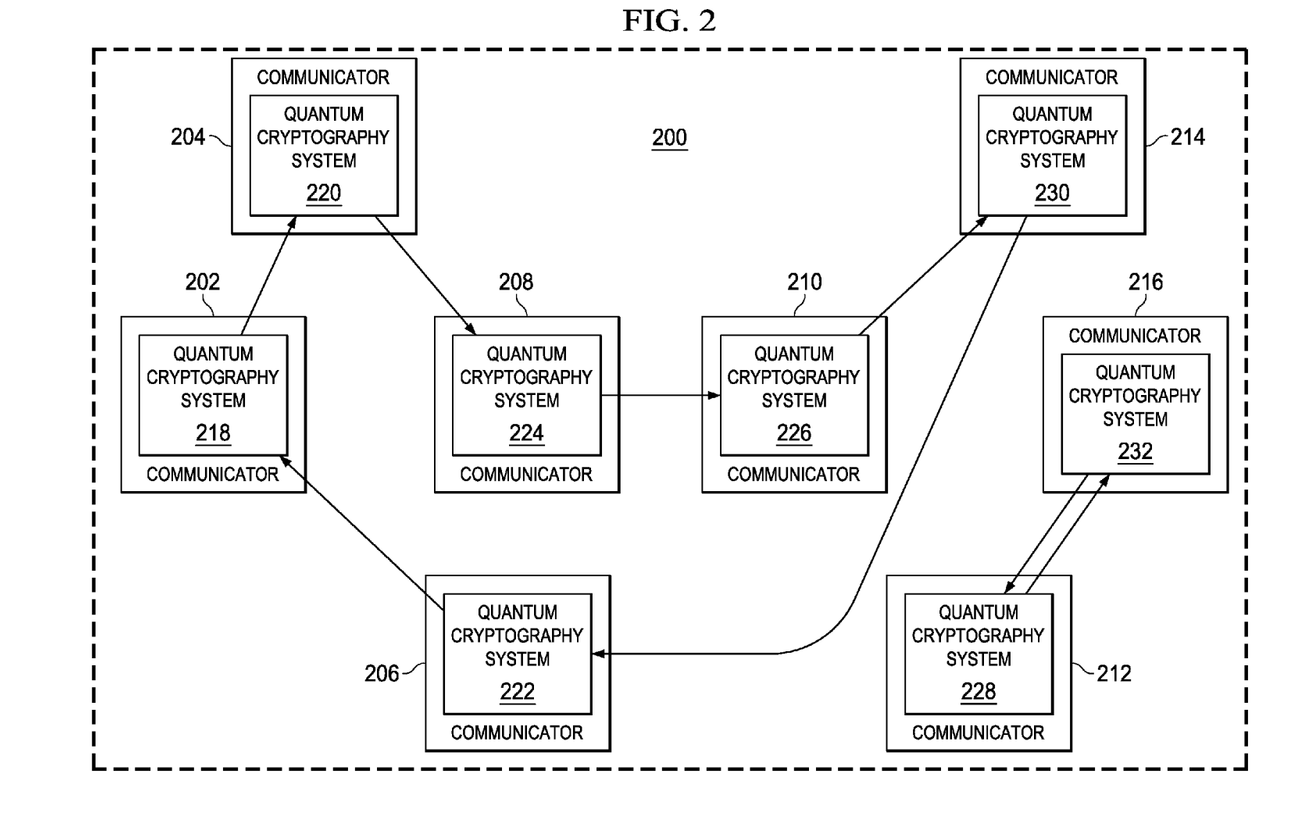
FIG. 2 is an illustration of a communications network in accordance with an illustrative embodiment.

With reference now to FIG. 2, an illustration of a communications network is depicted in accordance with an illustrative embodiment. Communications network 200 in FIG. 2 is an example of one implementation for communications network 102 in FIG. 1.

In this illustrative example, communications network 200 includes communicators 202, 204, 206, 208, 210, 212, 214, and 216. Each of these communicators may be implemented in a manner similar to communicator 106 in FIG. 1. Communicators 202, 204, 206, 208, 210, 212, 214, and 216 have quantum cryptography systems 218, 220, 222, 224, 226, 228, 230, and 232, respectively. Each of these quantum cryptography systems may be implemented in a manner similar to quantum cryptography system 112 in FIG. 1.

Any one of the communicators in communications network 200 may be capable of sending encrypted data and receiving encrypted data. For example, communicator 208 may use quantum cryptography system 224 to send encrypted data to communicator 210 using one encryption key and receive encrypted data from communicator 204 using a different encryption key. As another example, communicator 208 may use quantum cryptography system 232 to communicate in a two-directional manner with communicator 212 using quantum cryptography system 228 of communicator 212.

Further, communications network 200 may be implemented in a number of different ways. In particular, the communicators in communications network 200 may be implemented having different types of communications architecture. For example, without limitation, the communicators in communications network 200 may be implemented having a ring architecture, a centralized star architecture, a hub-and-spoke architecture, a mesh architecture, or some other type of network architecture.

Figure 3:
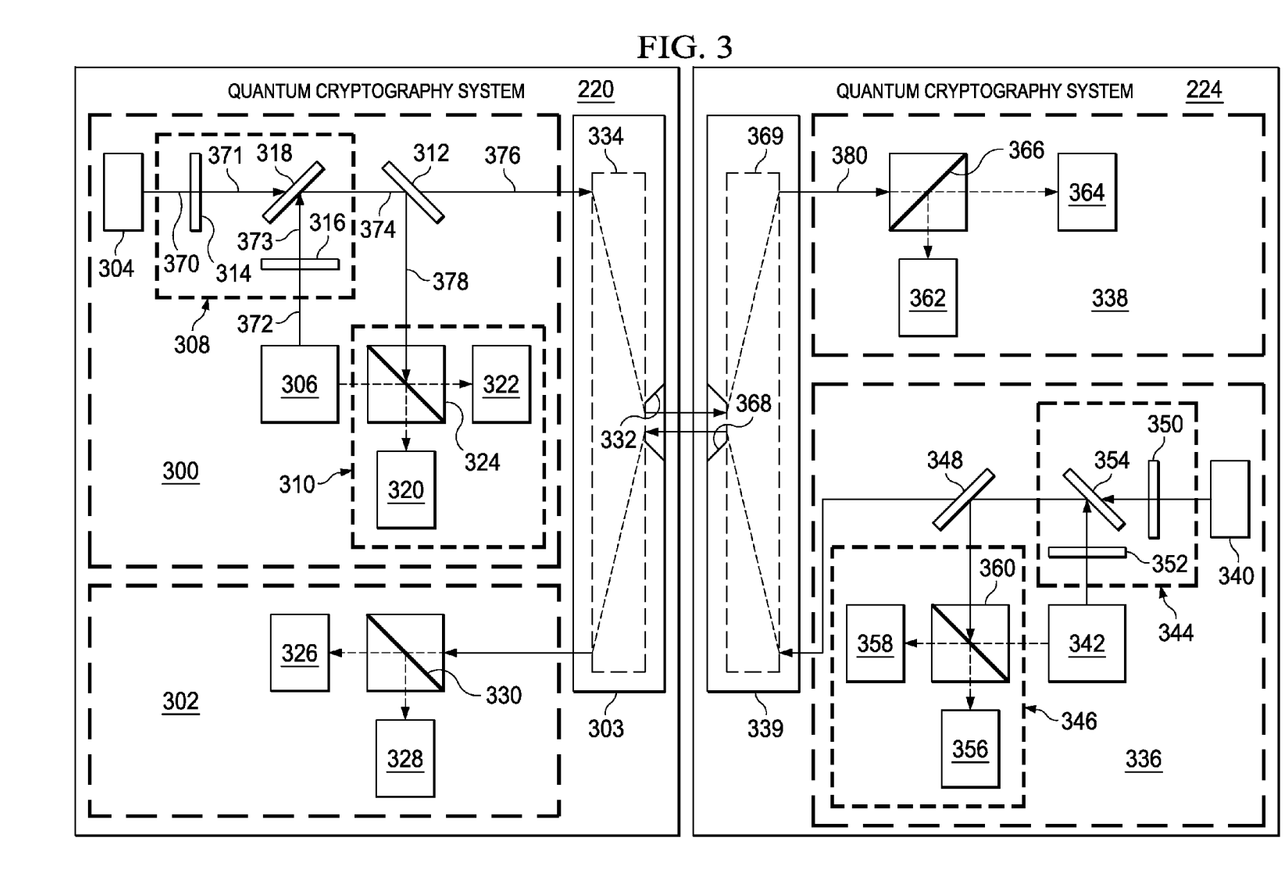
FIG. 3 is an illustration of two quantum cryptography systems in accordance with an illustrative embodiment.

With reference now to FIG. 3, an illustration of quantum cryptography system 220 and quantum cryptography system 224 from FIG. 2 is depicted in accordance with an illustrative embodiment. As depicted, quantum cryptography system 220 includes number generator 300, number detector 302, and optical system 303. Number generator 300, number detector 302, and optical system 303 are examples of implementations for number generator 122, number detector 124, and optical system 125, respectively, in FIG. 1.

In this illustrative example, number generator 300 includes source 304, source 306, polarization system 308, detection system 310, and beam splitter 312. Source 304 and source 306 are an example of one implementation for plurality of sources 129 in FIG. 1.

Polarization system 308 may be an example of one implementation for polarization system 131 in FIG. 1. As depicted, polarization system 308 includes first polarizer 314, second polarizer 316, and polarization combiner 318. Further, detection system 310 may be an example of one implementation for detection system 127 in FIG. 1. Detection system 310 includes first detector 320, second detector 322, and polarization analyzer 324.

Number detector 302 includes first detector 326, second detector 328, and polarization analyzer 330. First detector 326 and second detector 328 are an example of one implementation for plurality of detectors 137 in FIG. 1. Polarization analyzer 330 is an example of one implementation for polarization analyzer 138 in FIG. 1. Further, optical system 303 comprises aperture 332, through which photons may pass, and Faraday isolator 334. Aperture 332 and Faraday isolator 334 may be examples of implementations for aperture 133 and Faraday isolator 135, respectively, in FIG. 1.

Each of quantum cryptography systems 218, 222, 224, 226, 228, 230, and 232 from FIG. 2 may be implemented in a manner similar to quantum cryptography system 220. In particular, each of these quantum cryptography systems may have a number generator, a number detector, and a signal isolator configured in a manner similar to number generator 300, number detector 302, and optical system 303, respectively, of quantum cryptography system 220.

For example, quantum cryptography system 224 may include number generator 336, number detector 338, and optical system 339. Similar to number generator 300 in quantum cryptography system 220, number generator 336 includes source 340, source 342, polarization system 344, detection system 346, and beam splitter 348. Polarization system 344 includes first polarizer 350, second polarizer 352, and polarization combiner 354. Detection system 346 includes first detector 356, second detector 358, and polarizer 360.

Similar to number detector 302, number detector 338 includes first detector 362, second detector 364, and polarization analyzer 366. Optical system 339 includes aperture 368 and Faraday isolator 369.

In one illustrative example, quantum cryptography system 220 may establish an encryption key, or quantum encryption key, with quantum cryptography system 224 for transmission of encrypted data from communicator 204 to communicator 208 in FIG. 2. Quantum cryptography system 220 may send a selected number of qubits, or encoded photons, to quantum cryptography system 224 for use in establishing the encryption key.

Prior to establishing this encryption key, communicator 204 and communicator 208 from FIG. 2 may establish the number of qubits that will be generated and sent and the polarization state coding to be used by each quantum cryptography system. The number of qubits may include a number of initial qubits for alignment purposes. For example, quantum cryptography system 220 may determine that 100 qubits or more will be sent for use in forming the encryption key, 10 or more of which will be the initial qubits. Quantum cryptography system 224 may use the knowledge of this number of initial qubits to determine which incoming photons were received from quantum cryptography system 220 and not some other quantum cryptography system 220. Of course, depending on the implementation, the encryption key may be formed using any number of qubits. In some cases, no upper bound may be present for the number of qubits that may be used to form the encryption key. For example, the encryption key may be formed using a stream of long or never-ending random encryption keys instead of random encryption keys that repeat.

Further, communicator 204 may determine to use vertical polarization and horizontal polarization to polarize source photons. Communicator 208 may determine to use vertical polarization detectors and horizontal polarization detectors to detect the polarization of incoming photons. In other examples, communicator 204 and communicator 208 may use other types of polarization states such as, but not limited to, left hand polarization, right hand polarization, circular polarization, elliptical polarization, and/or some other type of polarization state.

The qubits may be generated by number generator 300. In this illustrative example, source 304 may generate and transmit first source photon 370 towards first polarizer 314 and source 306 may generate and transmit second source photon 372 towards second polarizer 316. First polarizer 314 polarizes first source photon 370 to form first polarized photon 371 and second polarizer 316 polarizes second source photon 372 to form second polarized photon 373. In one illustrative example, first polarized photon 371 is vertically polarized, while second polarized photon 373 is horizontally polarized.

The polarization state of first polarized photon 371 and the polarization state of second polarized photon 373 are combined at polarization combiner 318 to form superposed photon 374 having a superposed state that is a superposition of these two polarization states. Superposed photon 374 is split at beam splitter 312 to form outgoing photon 376 and detection photon 378. Outgoing photon 376 and detection photon 378 both have the same superposition of states as superposed photon 374. In other words, outgoing photon 376, detection photon 378, and superposed photon 374 may all have the same superposed state.

Detection photon 378 is detected by detection system 310. In particular, polarization analyzer 324 sends detection photon 378 randomly to one of first detector 320 and second detector 322. First detector 320 and second detector 322 convert the light energy of detection photon 378 into an electrical signal that may be read. A bit value of "0" or "1" may be read. A bit value of "1" may indicate that detection photon 378 was detected, while a bit value of "0" may indicate that detection photon 378 was not detected.

For example, when first detector 320 detects detection photon 378, second detector 322 does not detect detection photon 378. Consequently, a first bit value of "1" may be read for first detector 320, while a second bit value of "0" may be read for second detector 322. Similarly, when first detector 320 does not detect detection photon 378, second detector 322 detects detection photon 378. Consequently, a first bit value of "0" may be read for first detector 320, while a second bit value of "1" may be read for second detector 322.

For example, first detector 320 may detect vertical polarization and second detector 322 may detect horizontal polarization. When polarization analyzer 324 sends a vertically polarized photon to first detector 320, a bit value of "1" may be read. However, when polarization analyzer 324 sends a vertically polarized photon to second detector 322, a bit value of "0" may be read.

Similarly, when polarization analyzer 324 sends a horizontally polarized photon to second detector 322, a bit value of "1" may be read. When polarization analyzer 324 sends a horizontally polarized photon to first detector 320, a bit value of "0" may be read. The bit values read for each detector may be stored in a data structure, such as, for example, a data bin or any other type of memory device or memory structure.

Outgoing photon 376 is sent out through optical system 303. Outgoing photon 376 represents a qubit. The process described above is repeated for each qubit to be sent out. Faraday isolator 334 ensures that the only photons going out through aperture 332 are outgoing photons. For example, Faraday isolator 334 ensures that outgoing photons formed by number generator 300 are sent out through aperture 332 and that any incoming photons received from another quantum cryptography system through aperture 332 are sent to number detector 302.

Quantum cryptography system 224 may receive the outgoing photons sent by quantum cryptography system 220 as incoming photons through aperture 368 in optical system 339. Faraday isolator 369 ensures that only incoming photons are sent to number detector 338. For example, incoming photon 380 may be received at polarization analyzer 366 in number detector 338. Polarization analyzer 366 randomly sends incoming photon 380 to one of first detector 362 and second detector 364.

In one illustrative example, first detector 362 may detect vertical polarization and second detector 364 may detect horizontal polarization. When polarization analyzer 366 sends a vertically polarized photon to first detector 362, a bit value of "1" may be read. However, when polarization analyzer 366 sends a vertically polarized photon to second detector 364, a bit value of "0" may be read.

Similarly, when polarization analyzer 366 sends a horizontally polarized photon to second detector 364, a bit value of "1" may be read. When polarization analyzer 366 sends a horizontally polarized photon to first detector 362, a bit value of "0" may be read. The bit values read for each detector may be stored in a data structure, such as, for example, a data bin or any other type of memory device or memory structure. The process described above may be repeated for each incoming photon received through aperture 368.

However, in some cases, not all of the incoming photons may have been sent from a single quantum cryptography system. Quantum cryptography system 224 may need to determine which of these incoming photons were sent from quantum cryptography system 220. Quantum cryptography system 220 may share the bit values read by detection system 310 with quantum cryptography system 224. Quantum cryptography system 224 uses an alignment technique, such as a rastering technique, to determine which bit values, and thus incoming photons, correspond to quantum cryptography system 224. As one illustrative example, quantum cryptography may use the first 10 bit values sent from quantum cryptography system 220 to identify which incoming photons were from quantum cryptography system 220. Of course, depending on the implementation, quantum cryptography system 220 may use some other number of bit values to identify which incoming photons were from quantum cryptography system 220.

Once alignment has been achieved, quantum cryptography system 224 may be able to identify which of the bit values generated by number detector 338 were generated for incoming photons sent from quantum cryptography system 220. Quantum cryptography system 220 and quantum cryptography system 224 may then determine which bit values are to be used to form the encryption key.

The illustrations of communications network 200 in FIG. 2 and quantum cryptography system 220 in FIG. 3 are not meant to imply physical or architectural limitations to the manner in which an illustrative embodiment may be implemented. Other components in addition to or in place of the ones illustrated may be used. Some components may be optional.

The different components shown in FIG. 3 may be illustrative examples of how components shown in block form in FIG. 1 can be implemented as physical structures. Additionally, some of the components in FIG. 3 may be combined with components in FIG. 1, used with components in FIG. 1, or a combination of the two.

Figure 4:
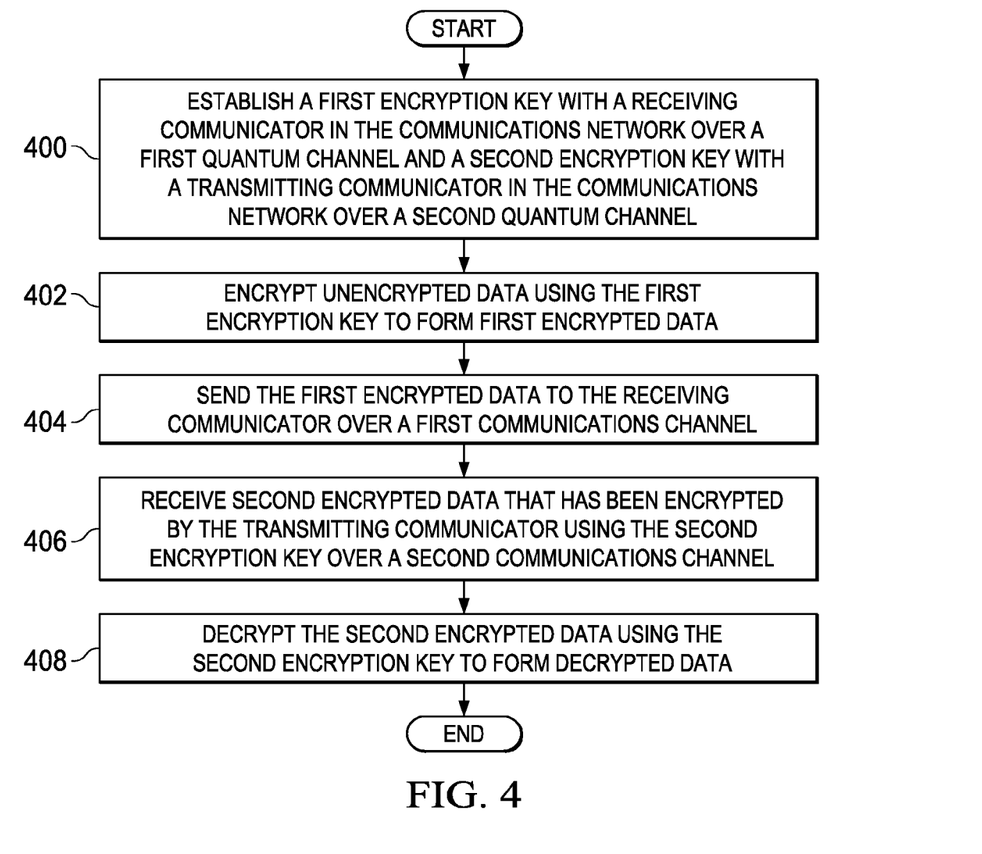
FIG. 4 is an illustration of a process for sending encrypted data to a receiving communicator in a communications network and receiving encrypted data from a transmitting communicator in the communications network in the form of a flowchart in accordance with an illustrative embodiment.

With reference now to FIG. 4, an illustration of a process for sending encrypted data to a receiving communicator in a communications network and receiving encrypted data from a transmitting communicator in the communications network is depicted in the form of a flowchart in accordance with an illustrative embodiment. The process illustrated in FIG. 4 may be implemented by communicator 106 in FIG. 1 using quantum cryptography system 112 in FIG. 1.

The process begins by establishing a first encryption key with a receiving communicator in the communications network over a first quantum channel and a second encryption key with a transmitting communicator in the communications network over a second quantum channel (operation 400). The first encryption key and the second encryption key may also be referred to as a first quantum encryption key and a second quantum encryption key, respectively.

Unencrypted data is encrypted using the first encryption key to form first encrypted data (operation 402). The first encrypted data is sent to the receiving communicator over a first communications channel (operation 404). The first communications channel may be, for example, a public communications channel that is not secure. The receiving communicator may then be able to use the first encryption key to decrypt the first encrypted data.

Further, second encrypted data that has been encrypted by the transmitting communicator using the second encryption key may be received over a second communications channel (operation 406). The second encrypted data is decrypted using the second encryption key to form decrypted data (operation 408), with the process terminating thereafter. In this manner, encrypted data may be sent from and received at the communicator.

Figure 5:
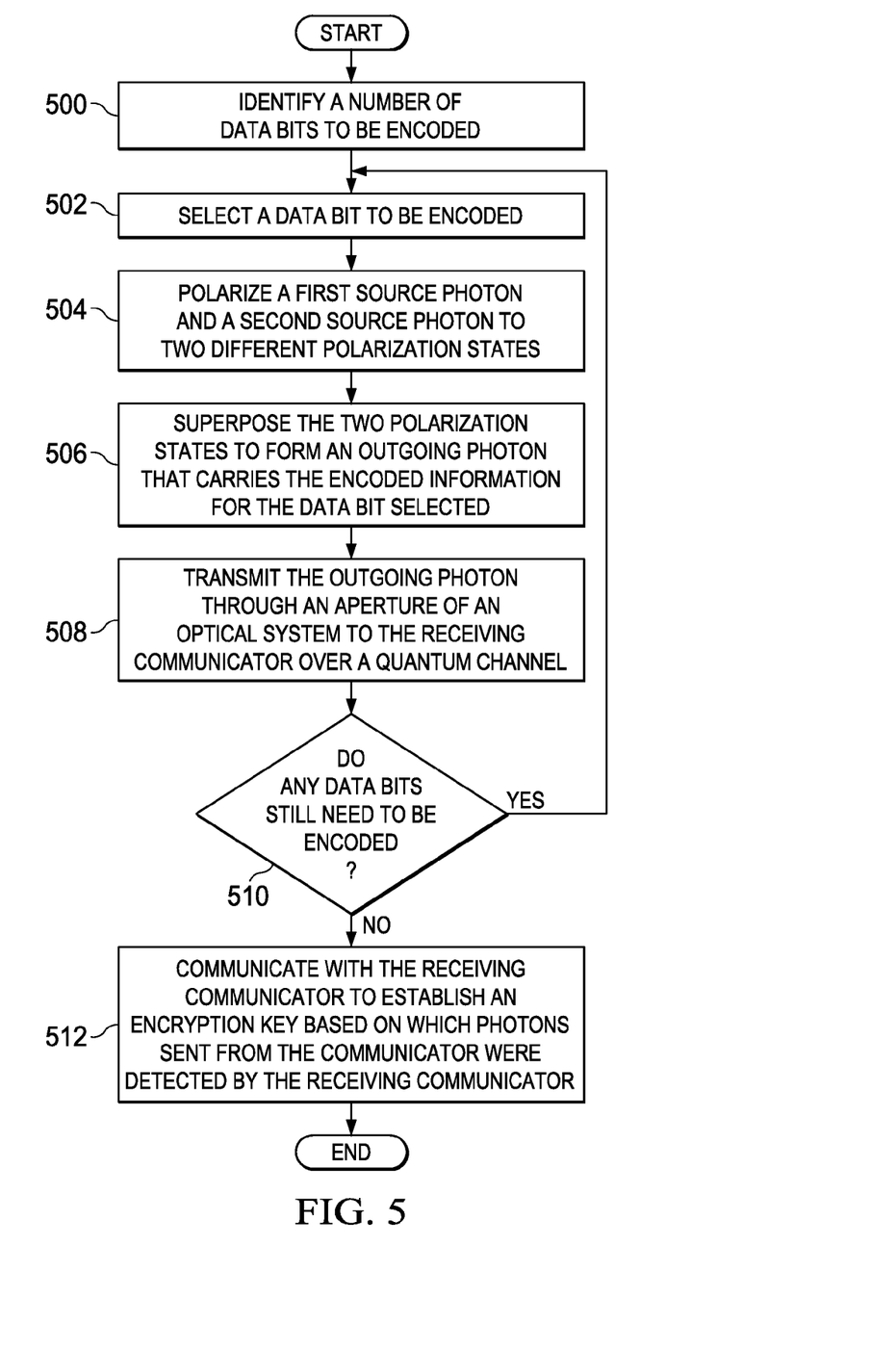
FIG. 5 is an illustration of a process for establishing an encryption key with a receiving communicator in the form of a flowchart in accordance with an illustrative embodiment.

With reference now to FIG. 5, an illustration of a process for establishing an encryption key is depicted in the form of a flowchart in accordance with an illustrative embodiment. The process illustrated in FIG. 5 may be an example of one manner in which operation 400 from FIG. 4 may be implemented by the communicator to establish the first encryption key with the receiving communicator described in operation 400 in FIG. 4.

The process begins by identifying a number of data bits to be encoded (operation 500). A data bit to be encoded is selected (operation 502). A first source photon and a second source photon are polarized to two different polarization states (operation 504). The two polarization states are then superposed to form an outgoing photon that carries the encoded information for the data bit selected (operation 506).

Next, the outgoing photon is transmitted through an aperture of an optical system to the receiving communicator over a quantum channel (operation 508). Next, the process determines whether any data bits still need to be encoded (operation 510).

If any data bits still need to be encoded, the process returns to operation 502 as described above. Otherwise, the communicator communicates with the receiving communicator to establish an encryption key based on which photons sent from the communicator were detected by the receiving communicator (operation 512), with the process terminating thereafter.

Figure 6:
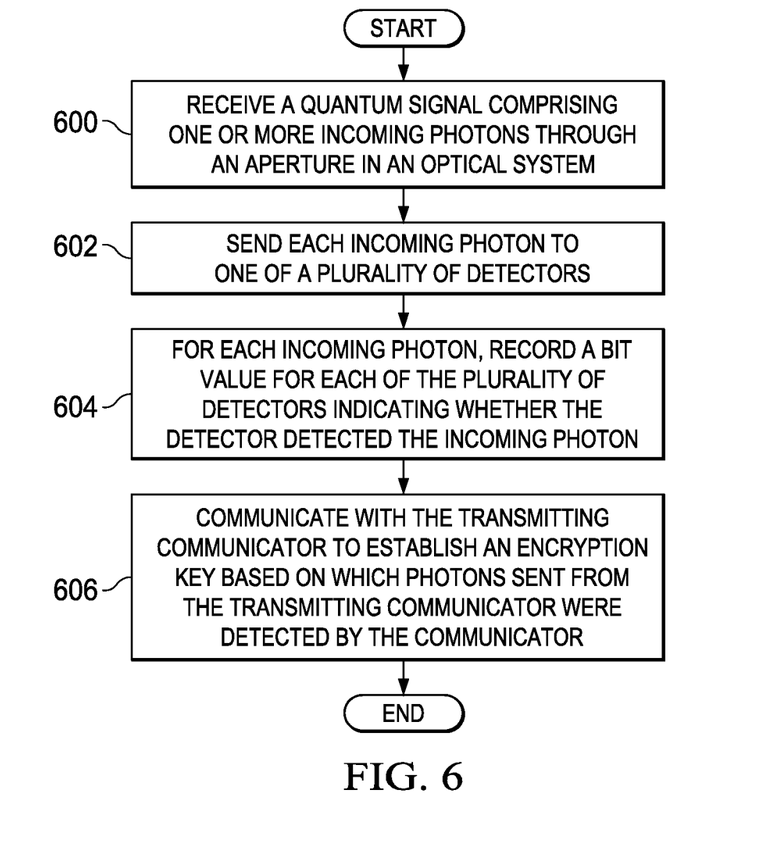
FIG. 6 is an illustration of a process for establishing an encryption key with a transmitting communicator in the form of a flowchart in accordance with an illustrative embodiment.

With reference now to FIG. 6, an illustration of a process for establishing an encryption key is depicted in the form of a flowchart in accordance with an illustrative embodiment. The process illustrated in FIG. 6 may be an example of one manner in which operation 400 from FIG. 4 may be implemented by the communicator to establish the second encryption key with the transmitting communicator described in operation 400 in FIG. 4.

The process begins by receiving a quantum signal comprising one or more incoming photons through an aperture in an optical system (operation 600). A polarization analyzer randomly sends each incoming photon to one of a plurality of detectors (operation 602). For each incoming photon, a bit value is recorded for each of the plurality of detectors indicating whether the detector detected the incoming photon (operation 604).

The communicator communicates with the transmitting communicator to establish an encryption key based on which photons sent from the transmitting communicator were detected by the communicator (operation 606), with the process terminating thereafter. In operation 606, the photons detected by the detectors in the communicator are correlated against a timing for the photons sent from the transmitting communicator to determine which of the photons detected by the detectors were sent from the transmitting communicator.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communicator in a communication network, the communicator comprising:
   a number generator configured to generate numbers for a first encryption key;
   an optical system configured to transmit a first quantum signal through an aperture in which the first encryption key is used in forming the first quantum signal, the optical system also configured to receive a second quantum signal;
   a number detector configured to detect a second quantum signal received through the aperture in which the second quantum signal is used in forming a second encryption key;
   a correlator configured to identify bit values for incoming photons received in the second quantum signal and correlate, temporally, the bit values identified for the incoming photons with bit values generated by a transmitting communicator for the incoming photons;
   a first source associated with the number generator configured to emit a first source photon;
   a second source associated with the number generator configured to emit a second source photon;
   a polarization system configured to polarize the first source photon and the second source photon to form a superposed photon, the superposed photon forming an outgoing photon that is directed towards an optical system; and a signal isolator configured to isolate the first quantum signal from the second quantum signal such that the first quantum signal is transmitted from the communicator in response to the first quantum signal passing through the aperture and such that the second quantum signal is received at the number detector in response to the second quantum signal passing through the aperture, wherein the communicator is one of a plurality of communicators in a communications network and wherein the number generator allows the communicator to establish the first encryption key and transmit the superposed photon to a receiving communicator in the communications network and the number detector allows the communicator to establish the second encryption key and receive a superposed photon from a transmitting communicator in the communications network, wherein the receiving communicator is different from the transmitting communicator.

2. The communicator of claim 1, wherein the polarization system comprises:

a first polarizer configured to polarize the first source photon to form a first polarized photon;

a second polarizer configured to polarize the second source photon to form a second polarized photon; and a polarization combiner configured to superpose a polarization state of the first polarized photon and a polarization state of the second polarized photon to form the superposed photon.

3. The communicator of claim 2, wherein the number generator further comprises:

a beam splitter configured to split the superposed photon to form an outgoing photon and a detection photon having a same superposed state in which the outgoing photon is part of the first quantum signal; and a detection system configured to detect the detection photon.

4. The communicator of claim 1, wherein the number detector comprises:

a first detector;
a second detector; and a polarization analyzer configured to receive an incoming photon in the second quantum signal received through the aperture and randomly send the incoming photon to one of the first detector and the second detector.

5. The communicator of claim 4, wherein the first detector is configured to detect horizontal polarization and the second detector is configured to detect vertical polarization.

6. The communicator of claim 4, wherein a bit value is recorded for each of the first detector and the second detector indicating whether the incoming photon is detected.

7. The communicator of claim 1 further comprising:

an encryption unit configured to encrypt unencrypted data using the first encryption key and decrypt encrypted data using the second encryption key.

8. The communicator of claim 1, wherein the signal isolator is a Faraday isolator comprising a Faraday rotator.

9. A communications network comprising:

a plurality of communicators in which each communicator in the plurality of communicators comprise:

a number generator configured to transmit a first quantum signal through an aperture in which the first quantum signal is configured for use in forming a first encryption key;

a number detector configured to detect a second quantum signal received through the aperture in which the second quantum signal is configured for use in forming a second encryption key;

a first source associated with the number generator configured to emit a first source photon;

a second source associated with the number generator configured to emit a second source photon;

a polarization system configured to polarize the first source photon and the second source photon to form a superposed photon;

an encryption unit configured to encrypt unencrypted data using the first encryption key and decrypt encrypted data using the second encryption key;

a correlator configured to identify bit values for incoming photons received in the second quantum signal and correlate, temporally, the bit values identified for the incoming photons with bit values generated by a transmitting communicator for the incoming photons using a rastering technique to find an alignment between bit values stored in a data structure and bit values received from the transmitting communicator; and a signal isolator configured to isolate the first quantum signal from the second quantum signal such that the first quantum signal is transmitted from a first communicator in response to the first quantum signal passing through the aperture and such that the second quantum signal is received at the number detector in response to the second quantum signal passing through the aperture, wherein each communicator in the plurality of communicators is in a communications network and wherein the number generator allows each communicator to establish the first encryption key and transmit the superposed photon to a receiving communicator in the communications network and the number detector allows the communicator to establish the second encryption key and receive a superposed photon from a transmitting communicator in the communications network, wherein the receiving communicator is different from the transmitting communicator.

10. A method for forming encryption keys, the method comprising:

emitting a first source photon from a first source;
emitting a second source photon from a second source;
polarizing the first source photon and the second source photon to form a superposed photon so as to generate a first quantum signal;

transmitting a first quantum signal generated by a number generator in a communicator through an aperture in the communicator to a receiving communicator;

receiving a second quantum signal through the aperture at the communicator from a transmitting communicator, the receiving communicator different from the receiving communicator;

establishing a first encryption key with the receiving communicator in a communications network using the first quantum signal;

establishing a second encryption key with the transmitting communicator in the communications network using the second quantum signal;

isolating the first quantum signal from the second quantum signal such that the first quantum signal is transmitted from the communicator in response to the first quantum signal passing through the aperture and such that the second quantum signal is received at a number detector in the communicator in response to the second quantum signal passing through the aperture;

identify bit values for incoming photons received in the second quantum signal; and correlate, temporally, the bit values identified for the incoming photons with bit values generated by the transmitting communicator for the incoming photons using a rastering technique to find an alignment between bit values stored in a data structure and bit values received from the transmitting communicator.

11. The method of claim 10, wherein establishing the second encryption key with the transmitting communicator comprises:

identify bit values for incoming photons received in the second quantum signal and a third quantum signal from a third communicator, the second quantum signal and the third quantum signal received at the same time; and correlate, temporally, the bit values identified for the incoming photons with bit values generated by the transmitting communicator and the third communicator for the incoming photons using a rastering technique to find an alignment between bet values stored in a data structure and bit values received from a transmitting communicator.

12. The method of claim 10 further comprising:
generating, by the number generator, the first quantum signal.

13. The method of claim 10, wherein polarizing the first source photon and the second source photon to form the superposed photon comprises:

polarizing the first source photon to form a first polarized photon;

polarizing the second source photon to form a second polarized photon; and superposing a polarization state of the first polarized photon with a polarization state of the second polarized photon to form the superposed photon.

14. The method of claim 10, wherein generating the first quantum signal further comprises:

splitting the superposed photon to form an outgoing photon and a detection photon having a same superposed state in which the outgoing photon is part of the first quantum signal.

15. The method of claim 10 further comprising:
sending, randomly, an incoming photon in the second quantum signal received through the aperture to one of a first detector and a second detector using a polarization analyzer; and detecting the incoming photon at one of the first detector and the second detector.

16. The method of claim 15 further comprising:
assigning a first bit value for the first detector, wherein the first bit value indicates whether the first detector detected the incoming photon; and assigning a second bit value for the second detector, wherein the second bit value indicates whether the second detector detected the incoming photon.

* * * * *